United States Patent
Viswanathan

(10) Patent No.: US 9,341,543 B2
(45) Date of Patent: May 17, 2016

(54) METHOD AND OTDR APPARATUS FOR OPTICAL CABLE DEFECT LOCATION WITH REDUCED MEMORY REQUIREMENT

(71) Applicant: Texas Instruments Incorporated, Dallas, TX (US)

(72) Inventor: Nagarajan Viswanathan, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 21 days.

(21) Appl. No.: 14/515,724

(22) Filed: Oct. 16, 2014

(65) Prior Publication Data

US 2016/0109327 A1    Apr. 21, 2016

(51) Int. Cl.
*G01M 11/00* (2006.01)

(52) U.S. Cl.
CPC .................... *G01M 11/3145* (2013.01)

(58) Field of Classification Search
None
See application file for complete search history.

(56) References Cited

U.S. PATENT DOCUMENTS

| | | | |
|---|---|---|---|
| 4,685,799 A | 8/1987 | Brininstool | |
| 4,812,038 A | 3/1989 | Nazarathy et al. | |
| 5,032,025 A * | 7/1991 | Bateman | G01M 11/3145 356/73.1 |
| 5,570,217 A | 10/1996 | Fleuren | |
| 6,122,043 A | 9/2000 | Barley | |
| 6,674,518 B1 | 1/2004 | Asher et al. | |
| 7,177,017 B2 | 2/2007 | Shyu | |
| 7,227,123 B2 * | 6/2007 | Kwon | G01B 11/18 250/227.14 |
| 7,742,157 B2 | 6/2010 | Lewis et al. | |
| 8,072,595 B1 | 12/2011 | Bastiaans et al. | |
| 9,194,763 B2 * | 11/2015 | Hu | G01M 11/3118 |
| 2003/0210387 A1 * | 11/2003 | Saunders | H04B 10/071 356/73 |
| 2004/0046109 A1 * | 3/2004 | Chen | G01D 5/35303 250/227.14 |
| 2013/0148958 A1 * | 6/2013 | Liang | H04B 10/272 398/13 |
| 2013/0202290 A1 | 8/2013 | Dvir | |
| 2013/0251363 A1 | 9/2013 | Joffe et al. | |
| 2014/0268110 A1 * | 9/2014 | Hartog | G01D 5/35364 356/73.1 |

* cited by examiner

*Primary Examiner* — Gordon J Stock, Jr.
(74) *Attorney, Agent, or Firm* — Gregory J. Albin; Frank D. Cimino

(57) ABSTRACT

Optical time domain reflectometer (OTDR) systems, methods and integrated circuits are presented for locating defects in an optical cable or other optical cable, in which a first optical signal is transmitted to the cable and reflections are sampled over a first time range at a first sample rate to identify one or more suspected defect locations, and a second optical signal is transmitted and corresponding reflections are sampled over a second smaller time range at a higher second sample rate to identify at least one defect location of the optical cable for relaxed memory requirements in the OTDR system.

20 Claims, 7 Drawing Sheets

METHOD AND OTDR APPARATUS FOR OPTICAL CABLE DEFECT LOCATION WITH REDUCED MEMORY REQUIREMENT

BACKGROUND

Optical time domain reflectometers or OTDRs are used to locate defects in an optical cable by transmitting pulses into the cable and receiving light pulses due to Rayleigh scattering, reflection or other effects. The received light signal is analyzed by correlating time delays between the input signal and the reflected light signals. Certain OTDR systems include displays for presenting loss curves to a user showing trace discontinuities corresponding to defect locations along the length of an optical fiber under test. The design specifications of the OTDR system are related to the speed of light traveling through the cable, the overall length of the cable, and the desired resolution or accuracy of the estimate of the location (distance) of the identified fault(s). It is desirable to provide an analysis with a relatively small resolution in order to facilitate assessment of defects and remedial efforts to repair damaged optical cables. For example, it may be desirable to identify the defect location within a resolution distance of 0.5 m to direct service personnel to the appropriate location for maintenance or repair. However, long cable lengths in combination with relatively small resolution distances leads to analysis of a large sample of data, and the OTDR system must store the sample data in a relatively large electronic memory. Large memories, in turn occupy significant areas on integrated circuits, and consumed power, whereby a need remains for improved OTDR techniques and apparatus for locating defects in an optical cable with relaxed memory requirements.

SUMMARY

Presently disclosed embodiments reduce the memory requirements for OTDR systems through a multi-step search technique including a coarse search to identify suspected defect locations and one or more fine or high-resolution searches to confirm or refine a defect location and/or to identify and locate further defects. OTDR systems, methods and integrated circuits are provided in which a first optical signal is transmitted to the cable and reflections are sampled over a first time range at a first sample rate to identify one or more suspected defect locations. A second optical signal is transmitted and corresponding reflections are sampled over a smaller second time range at a higher second sample rate to identify one or more defect locations of the optical cable. The use of low-resolution or "coarse" initial search reduces the amount of memory required to store sample data, particularly for long optical cable lengths, and the targeted "fine" search employs higher sample rates to provide the desired resolution for defect location identification. In certain embodiments, different pulse widths can be employed in the input signal for the first and second searches to facilitate differentiating between multiple closely spaced defect locations.

DESCRIPTION OF THE VIEWS OF THE DRAWINGS

The following description and drawings set forth certain illustrative implementations in detail, which are indicative of several ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
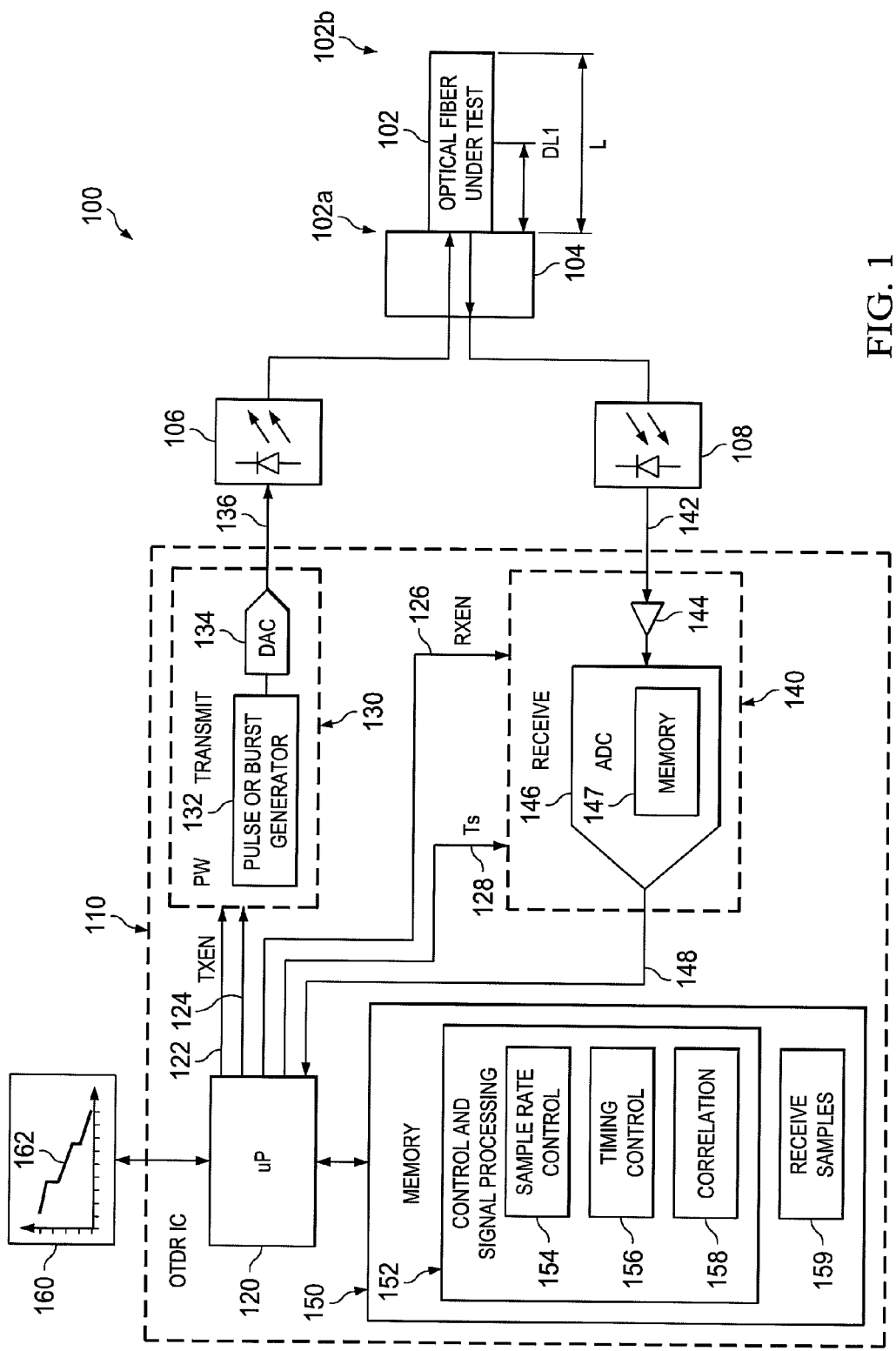
FIG. 1 is a schematic diagram showing an OTDR system with an integrated circuit implementing a multistep defect location process.

One or more embodiments or implementations are hereinafter described in conjunction with the drawings, wherein like reference numerals are used to refer to like elements throughout, and wherein the various features are not necessarily drawn to scale.

FIG. 1 shows an OTDR system 100 for identifying locations of one or more defects along the length L of an optical cable 102. The system 100 includes a splitter or circulator 104 through which an optical or light source 106 provides an optical transmit signal to a first end 102a of the optical cable 100 and from which an optical sensor 108 receives backscattered or reflected light from the first end 102a. An OTDR integrated circuit (IC) 110 is provided in the embodiment of FIG. 1 with suitable connections for interfacing with the optical source 106 and the optical sensor 108, as well as communications connections for interfacing with a display 160 to provide data and/or graphical curves 162 and other information to a user, along with power and ground connections (not shown) for operating the various components within the IC 110. The OTDR IC 110 also includes a processor 120 providing output data to the display 160 as well as various control signals or values 122-128 for operating a transmit or transmitter circuit 130 and a receive or receiver circuit 140.

The transmit circuit 130 in the example embodiment operates according to a transmit enable signal 122 (TXEN) from the processor 120 to provide or generate a transmit signal 136 defining at least one pulse to operate the optical source 106 for transmitting optical signals at the first end 102a of the optical cable 102 via the splitter 104. In addition, the example transmit circuit 130 includes a pulse or burst generator circuit 132 with a pulse width control input receiving a pulse width control signal or value 124 (PW) from the processor 120 to control a pulse width parameter of the transmit signal 136 and thus a pulse width of the transmitted optical signal provided by the optical source 106. The transmit circuit 130 further includes a digital to analog converter 134 (DAC) providing the transmit signal 136 as a current signal to drive the optical source 106. Any suitable optical source 106 can be used, such as a laser diode or a P-I-N diode which provides a light output or optical signal to the splitter 104 for transmission to the first end 102*a* of the optical cable 102.

The transmitted optical signal travels at the speed of light along the length L of the connected optical cable 102 between the first end 102*a* and a second end 102*b* from left to right in the figure, and is then reflected from the second end 102*b* from left to right back to the first end 102*a*, with reflection or back scattering occurring at one or more defect locations DL1 along the length L of the cable 102. The transmit circuit 130 generates any suitable form of single or multi-pulse transmit signal 136 to provide a single pulse with a controlled pulse width or multiple pulses, such as a pseudorandom binary sequence (PRBS) signal of a controlled energy, to create the optical transmit signal at the output of the optical source 106. The splitter 104 provides isolation between the transmit circuit 130 and the receive circuit 140, with received optical pulses being coupled from the optical cable 102 to the receive circuit 140 through the splitter 104 to provide an input optical signal to the sensor 108. Any suitable optical sensor 108 can be used, such as an avalanche photodiode or P-I-N diode that converts optical pulses to current pulses to provide a receive signal 142.

The receive circuit 140 operates to sample the received current output signal 142 provided by the sensor 108, with a signal conditioning circuit 144 including a trans-impedance amplifier (TIA) to convert the current signal 142 to a voltage output representing the received optical reflections. The signal conditioner 144 may further include a low noise amplifier (LNA) and an anti-aliasing low pass filter or an analog to digital converter 146 (ADC) with suitable sample and hold front-end circuitry to sample the filtered signal at a sample rate having a controlled sample period set according to a control signal or value 128 (Ts) from the processor 120. In addition, the receive circuit 140 is selectively enabled or disabled according to a receive enable signal 126 (RXEN) from the processor 120. In operation when enabled via the signal 126, the receive circuit 140 samples the receive signal 142 at a selectable sample rate, and provides sample data as converted binary values directly to an optional on-board electronic memory 147 and/or to a memory 150 via the processor 120, where the sample data corresponds to the optical reflections received by the optical sensor 108 and sampled via the ADC 146.

The electronic memory 147 and/or 150 stores the receive samples, with the optional on-board memory 147 in certain embodiments performing real-time accumulation and averaging synchronously with respect to the transmitted output from the optical source 106. The processor 120 in certain embodiments operates according to program instructions 152 stored in the memory 150 in order to implement control and signal processing functions for the OTDR IC 110, including a sample rate control component 154, a timing control component 156 and a correlation component 158, which may operate on received samples 159 stored in the memory 150 and/or on received sample data stored in the ADC memory 147.

In one non-limiting example, the processor 120 implements instructions of the control and signal processing components 152 from the memory 150, including selective provision of control signals and/or values 122 and 124 to operate the transmit circuit 130 and signals and/or values 126 and 128 to operate the receive circuit 140. In addition, the processor 120 implements instructions for analysis of data 148 sampled by the receive circuit 140, whether stored in the local memory 147 of the receive circuit 140 and/or receive sample data 159 stored in the main memory 150. In one embodiment, the processor 120 analyzes sample data stored in the memory 147, which is integrated into the ADC converter 146 in order to temporally correlate a set of sample data with an optical signal transmitted under control of the processor 120 by the transmit circuit 130 and the optical source 106. In certain implementations, moreover, the dynamic range of the receiver circuit 140 may be improved by averaging signal data 142 from the optical sensor 108, with the transmit circuit 130 transmitting a sequence of optical signals to the optical cable 102, and the output of the sensor 108 being sampled and converted by the ADC 146. In this case, the memory 147 synchronously accumulates and averages sample values for subsequent correlation by the processor 120. Such accumulated sample data, moreover, can be subsequently transferred to the memory 150 for processing by the processor 120. In other possible embodiments, the sample data is provided by the ADC 146 to the processor 120, whether averaged by intermediate accumulation in the local memory 147 or not, and the sample data is stored as receive samples 159 in the memory 150, with the processor 120 performing the correlation analysis based on the data 159 stored in the memory 150.

Figure 2:
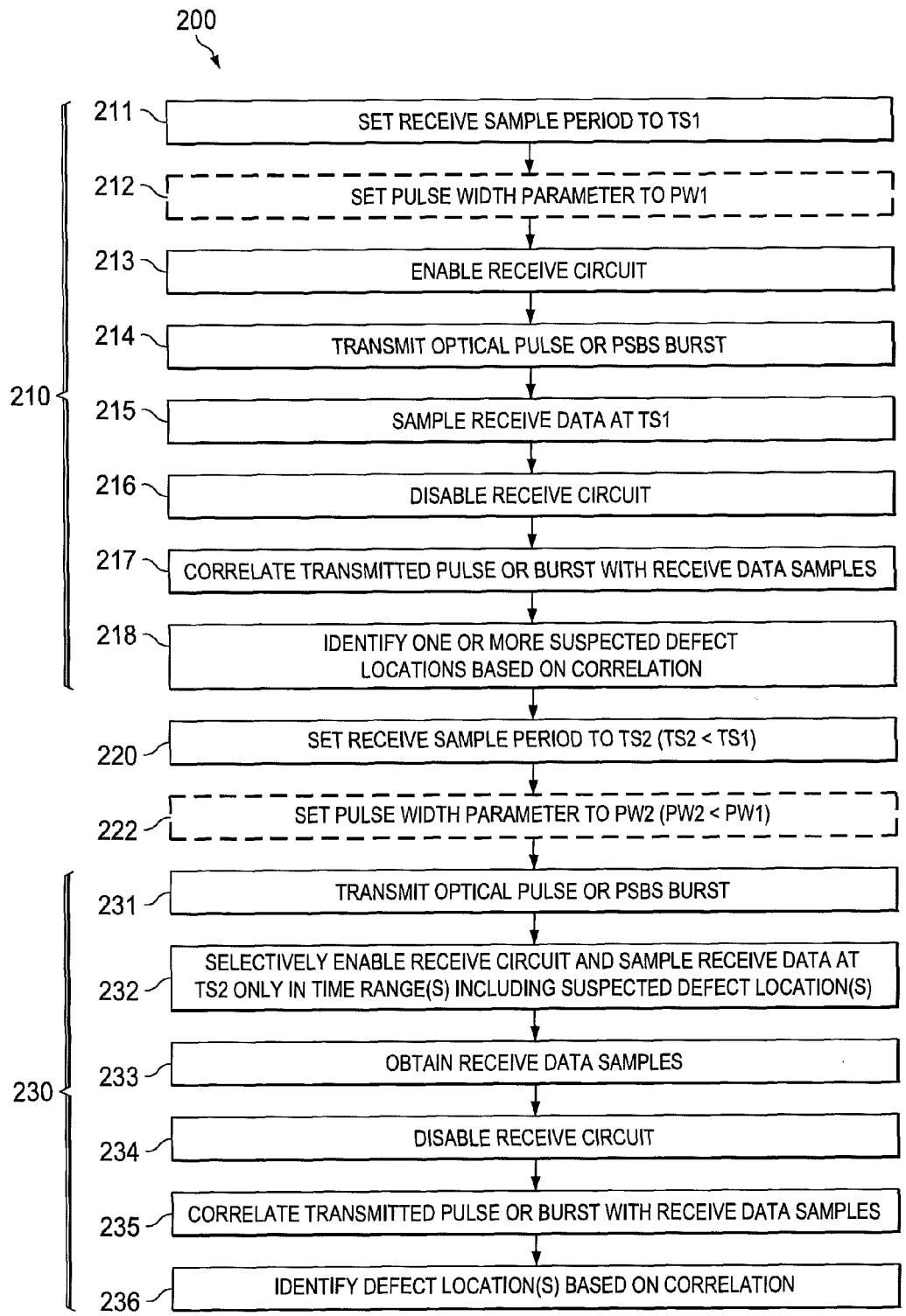
FIG. 2 is a flow diagram showing a process for locating defects in an optical cable.
Figure 3:
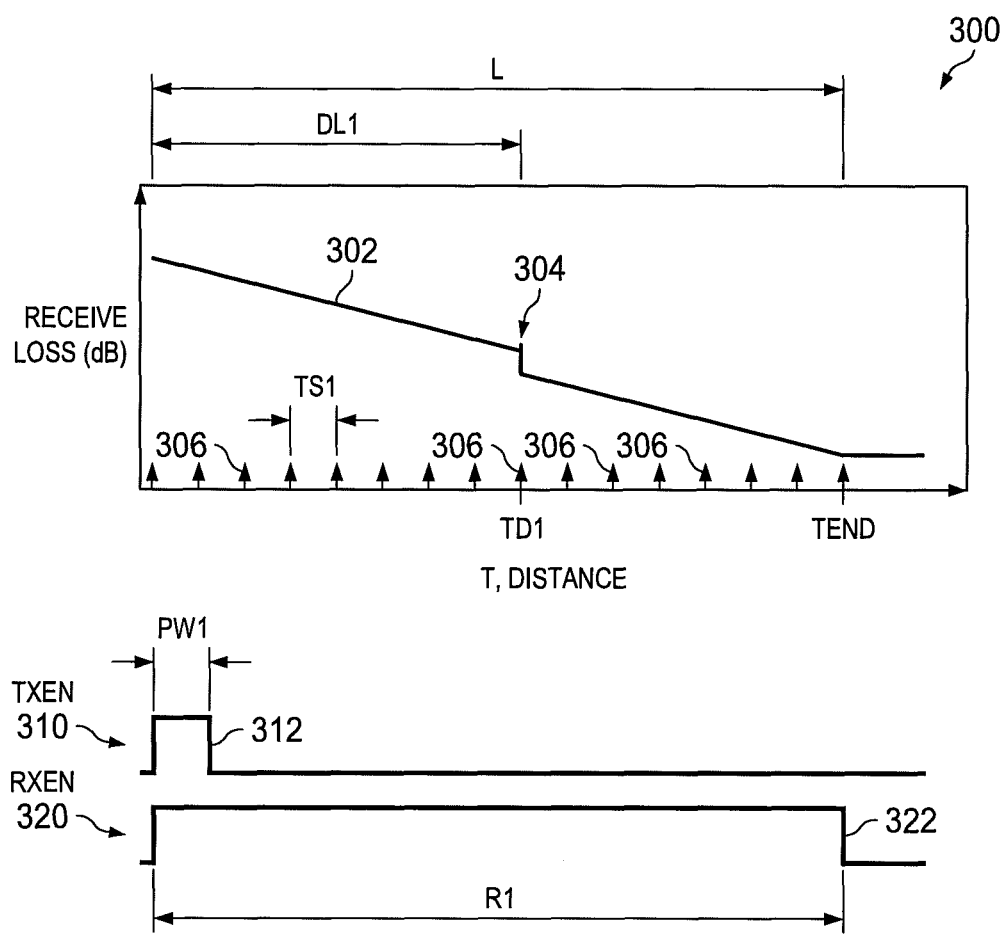
FIG. 3 is a graph showing coarse OTDR processing over a first time range in the system of FIG. 1.
Figure 4:
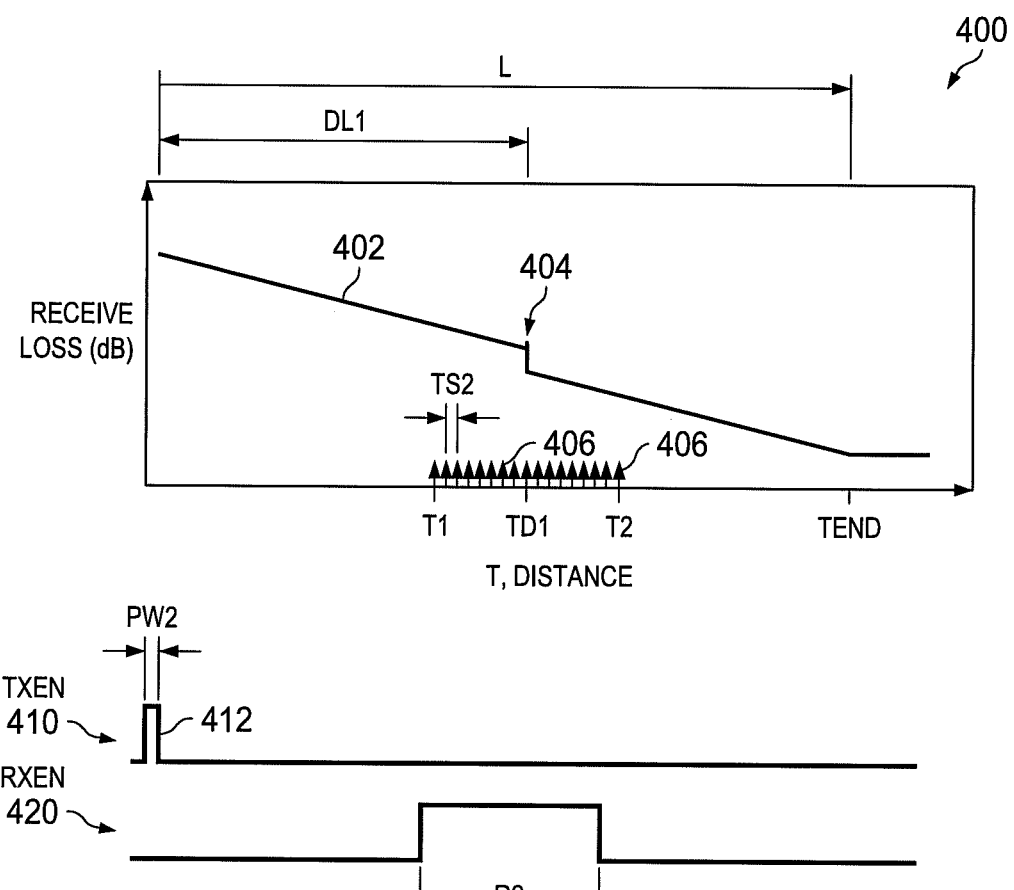
FIG. 4 is a graph showing fine OTDR processing over a smaller second time range at a higher sample rate to identify a single defect location in the system of FIG. 1.

Referring also to FIGS. 2-4, FIG. 2 illustrates a process or method 200 for locating defects in the optical cable 102, which can be implemented in certain embodiments using the OTDR system 100 of FIG. 1. FIG. 3 provides graphs 300, 310 and 320 showing coarse OTDR processing over a first time range R1 using a relatively low sample rate or sample frequency Fs=1/TS1 in the system 100, and FIG. 4 provides graphs 400, 410 and 420 showing fine OTDR processing over a smaller second time range R2 at a higher sample rate (Fs=1/TS2) to identify a single defect location (location DL1 in FIG. 1). While the method 200 is illustrated in FIG. 2 and described in the form of a series of acts or events, the various methods of the present disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware as illustrated and described above, and/or using processor-executed software, processor-executed firmware, FPGAs, logic circuitry, etc. or combinations thereof, in order to provide the OTDR functionality described herein for locating defects in an optical cable 102, although the present disclosure is not limited to the specifically illustrated or described applications and systems.

In operation according to one embodiment, the processor 120 implements a coarse or first identification step 210 in FIG. 2, followed by a subsequent fine identification step 230. The initial identification at 210 includes setting a receive sample period TS1 at 211 for operation of the ADC 146, for example, by the processor 120 providing a signal or value 128 to the receive circuit 140 indicating the selected initial sample period TS1 (or its reciprocal as a sample frequency Fs1=1/TS1). In certain embodiments, moreover, the processor 120 may optionally set a pulse width parameter PW via a signal or value 124 provided to the transmit circuit 130 in order to control the pulse width of a single pulse or burst of pulses provided by the generator circuit 132. Where a single pulses generated by the transmit circuit 130, the pulse width parameter PW in one embodiment directly sets the width of the transmitted pulse. In certain embodiments where the transmit circuit 130 provides a series of pulses or a burst, such as a pseudorandom pulse stream, the pulse width parameter PW such a total energy of the burst.

The processor 120 enables the receive circuit at 213 (high-going edge of RXEN waveform 322 in graph 320 of FIG. 3), and provides the transmit enable control signal or value 122 to the transmit circuit 130 (high-going edge of TXEN waveform 312 in graph 310) in order to cause the transmit circuit 130 and the optical source 106 to generate a first optical signal at the first end or location 102a of the optical cable 102 at 214 in FIG. 2. The processor 120 may provide a single transmit enable control signal to the transmit circuit 130 in certain embodiments, with the leading edge determining the start time of the transmitted pulse and the trailing edge of the control signal determining the trailing edge, and hence the pulse width of the transmitted pulse.

The receive circuit 140 samples the receive signal 142 at the first sample rate 1/TS1 over a first time range R1 at 215, and the processor 120 disables the receive circuit at 216 (e.g., using the receive enable signal 126). In the illustrated example, the first time range R1 extends from the transmission of the input pulse by the transmit circuit 130 through a time TEND corresponding to the length of time necessary for a light pulse to travel from the first end 102a of the cable 102 to the second end 102b, and to be reflected back to the first end 102a. In other embodiments, the time range R1 may extend beyond TEND, or may be terminated before TEND, for example, if only a certain distance range of interest is being analyzed for defect locations in the optical cable 102.

As seen in FIG. 3, the ADC 146 in the example embodiment employs periodic sampling with a relatively long sample period TS1, where FIG. 3 shows the sample points 306 illustrated along the horizontal time/distance axis in the graph 300. In the example of FIGS. 3 and 4, sixteen samples 306, 406 are shown for ease of illustration, but any suitable number of samples can be employed in various implementations. The receive circuit 140 thus obtains a first set of sample data corresponding to reflections of the first optical signal. The processor 120 temporally correlates the first set of sample data with the transmitted first optical signal at 217 in FIG. 2, and identifies one or more suspected defect locations at 218 based at least partially on the correlation. In the example of FIGS. 3 and 4, the processor 120 identifies a first time TD1 (shown in graph 300 of FIG. 3) which corresponds to a suspected defect location DL1 (FIG. 1) based at least partially on a receive loss curve produced by the temporal correlation. Any suitable temporal correlation can be employed at 217, for example, a stepwise multiplication of an input waveform corresponding to the transmitted optical signal with the received data using accumulation, with the input waveform being stepwise shifted in time to deduce a correlation curve representing time delay between the transmission of the input pulse and receipt of the receive pulse. The processor 120 in one example generates the curve 302 in FIG. 3 representing receive loss in dB having a discontinuity 304 at the time TD1, representing a drop in receive signal strength a time TD1 after transmission of the input pulse into first end 102a of the optical cable 102. In this example, the processor 120 identifies one or more suspected defect locations by analyzing the curve 302 with respect to discontinuities including without limitation drops from a normal expected downward slope and/or spikes as seen at 304 in FIG. 3.

At 220 in FIG. 2, the processor 120 sets the ADC sample period of the receive circuit 140 at 220 (e.g., via the Ts control signal or value 128 in FIG. 1) to a shorter value TS2 (<TS1), and optionally sets the transmit pulse width parameter PW of the transmit circuit 130 (e.g., via signal or value 124) to a shorter value PW2 (<PW1) at 222. The processor 120 implements a second (fine) defect location step at 230 in FIG. 2, including providing one or more further transmit control signals or values 122, 124 to cause the transmit circuit 130 and the optical source 106 to generate and transmit a second optical signal at the first end 102a of the optical cable 102 at 231. In this example, the processor 120 selectively enables the receive circuit at 232 by selective actuation of the enable signal or value 126 to sample the receive signal 142 at the second sample rate (Fs=1/TS2) over the second time range R2 following transmission of a second optical signal from the transmit circuit 130 and the optical source 106. As seen in FIG. 4, moreover, the second time range R2 extends from T1 through T2 in the graph 400, and includes the suspected defect location TD1, but his significantly shorter than the original time range R1 used in the coarse processing of FIG. 3. Although the second range R2 shown in FIG. 4 is generally equally spaced on either side of the suspect location TD1, other suitable second ranges can be implemented by the processor 120 in other embodiments which include the suspect location TD1, but which need not be symmetrically spaced around the suspect location TD1. As discussed further below in connection with FIGS. 7-9, however, the inventor has appreciated that centering the fine processing range R2 around the initially suspected location TD1 advantageously facilitates the potential for subsequent discovery of multiple closely-spaced defects within the fine search range R2 using higher sample rates and preferably narrower transmit pulse widths.

At 233 in FIG. 2, the samples are stored in the memory 147 of the receive circuit 140 and/or in the memory 150, where the receive circuit 140 may perform accumulation averaging in certain embodiments as described above. In one possible implementation, the time range R2 is implemented by the processor 120 selectively enabling the receive circuit (curve 422 in graph 420 of FIG. 4) prior to TD1 parentheses e.g., at T1), and then disabling the receive circuit 140 at T2 after TD1 (at 234 in FIG. 2), with the high-speed sampling at 1/TS2 providing a second set of sample data corresponding to reflections of the second transmitted optical signal (samples shown at 406 in FIG. 4). The processor 120 temporally correlates the second set of sample data with the transmitted second optical signal at 235, for example, using the above described correlation techniques, and identifies one or more defect locations at 236 in FIG. 2 (e.g., defect location DL1 in FIG. 1) based at least in part on the temporal correlation. For example, the processor 120 can use discontinuity detection with respect to a receive loss curve resulting from the temporal correlation in order to identify defect locations at 236. Thereafter, the processor 120 may provide defect location information to a user, for example, by displaying a curve 162 on the display 160 as seen in FIG. 1, or by other graphical and/or numeric indication.

As seen in the graph 400 of FIG. 4, the samples 406 in the fine measurement are spaced much closer than the samples 306 in the coarse process shown in FIG. 3. In addition, the first and second sets of sample data may include equal numbers of samples, although not a strict requirement of all possible embodiments. This technique advantageously facilitates relaxation of the memory requirements by selectively using high sample rates in identified areas along the length of the optical cable 102 at which a defect is suspected. In contrast, conventional OTDR techniques utilizing high sample rates along the entire length L of the optical fiber under test 102 would necessarily need to provide memory storage for a significantly larger number of data samples. The process 200, in contrast, selectively employs high sample rate data acquisition at select locations (e.g., the second time range R2) within the overall range R1 thereby employing the memory in an intelligent manner and allowing the system 102 to incorporate less memory 147, 150. This reduced or relaxed memory requirement, moreover, provides for power efficiency of the OTDR IC 110, as the receive circuitry 140 need only be enabled during the second time range R2, as shown by the receive enable signal curve 422 in graph 420 of FIG. 4, and since the overall power drawn by the system memory is reduced compared with conventional OTDR systems having larger electronic memories.

Thus, the system 100 and the process 200 of the present disclosure advantageously facilitate OTDR operations for locating defects in an optical cable 102 for any cable length, and with any desired defect location resolution. It is noted that the initial or coarse processing at 210 can advantageously employ a relatively slow sample rate 1/TS1 and a relatively long transmit pulse width PW1 resulting in good signal-noise ratio (SNR), while providing a general indication of suspected defect locations at a coarse resolution, with the subsequent processing at 230 employing a higher sample rate, and potentially using a narrower pulse width PW2 for improved resolution at the identified range or ranges of interest. In certain embodiments, the processor 120 sets the second sample rate 1/TS2 to be greater than or equal to an integer K times the first sample rate 1/TS1, for example, where K>1, such as K=10 in one example. In this regard, the second sample rate 1/TS2 can be set according to desired defect location identification resolution specifications for a given application, and the resolution in the initial coarse analysis at 210 is reduced by the factor K. In certain embodiments, for example, the processor 124 sets the second sample rate (1/TS2) to be greater than or equal to of the speed of light in the optical cable under test 102 divided by half a desired or target resolution value (twice the speed of light in the optical cable/the target defect location resolution), which may be provided by a user or which may be a predetermined value. Moreover, this technique can be employed in certain embodiments to also reduce the memory requirements by the factor K, for example, where the same number of samples is obtained in the coarse and fine sub-processes 210 and 230, respectively.

In addition, the processor 120 may intelligently set the transmit pulse width via the PW control signal or value 124 in the course and/or fine sub-processes 210, 230 based at least partially on the selected sample rate. For example, the processor 120 in one embodiment sets the second pulse width PW2 to be greater than or equal to twice the second sample period TS2 (PW2≥(2/(1/TS2))), with the second pulse width PW2 being less than the first pulse width PW1 in certain implementations. The graph 410 in FIG. 4 illustrates the use of a narrower pulse for the fine measurement transmit enable signal waveform 412 having a width PW2 which is less than the width PW1 in the enable signal waveform 312 used in the coarse measurement of FIG. 3. As discussed further below in connection with FIGS. 7-9, this selective provision of a narrower pulse width advantageously facilitates differentiation between closely spaced defects along the length of the cable under test 102.

Figure 5:
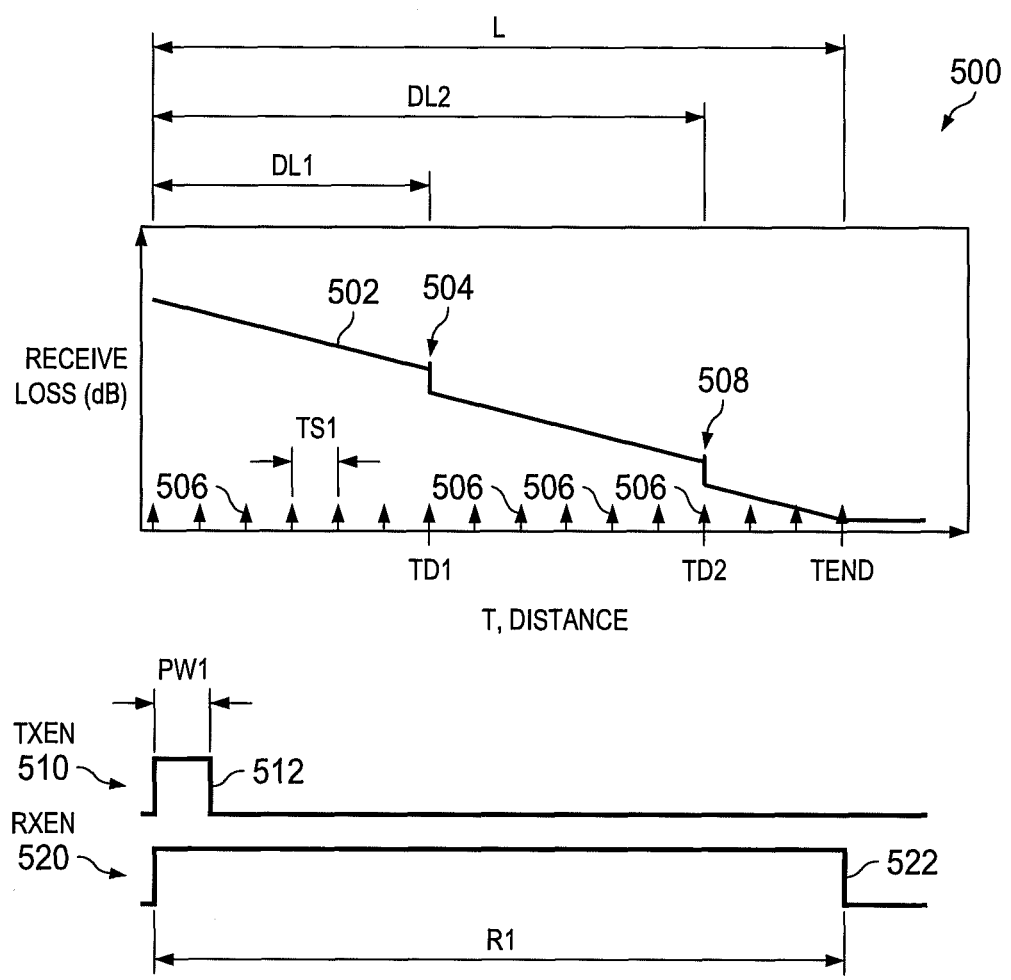
FIG. 5 is a graph showing coarse OTDR processing to identify multiple suspect defect locations in the system of FIG. 1.
Figure 6:
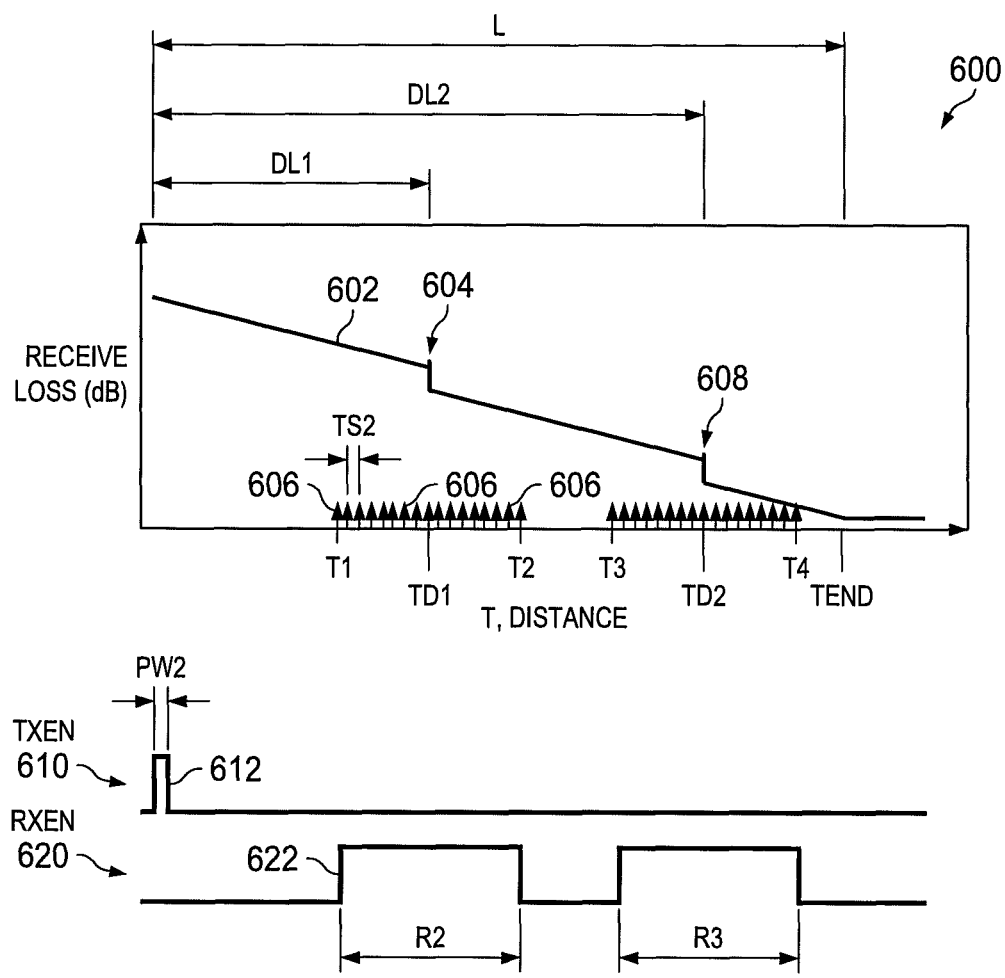
FIG. 6 is a graph showing fine OTDR processing to identify multiple defect locations in the system of FIG. 1.

FIGS. 5 and 6 provide graphs 500, 510, 520, 600, 610 and 620 illustrating another example implementation for the situation in which multiple defects exist at locations DL1 and DL2 along the length of the optical cable 102. In the coarse processing of FIG. 5, the samples 506 are spaced by TS1 over the full range R1 implemented by the receiver enable waveform 522 (RXEN) in graph 520, and the transmitted pulse or burst is provided with a pulse width PW1 via the transmit enable signal waveform 512 in graph 510 (TXEN). In this case, correlation of the initial set of receive data samples identifies a first suspected location at TD1 as well as a second suspected defect location at TD2 based on discontinuities 504 and 508 in the coarse receive loss curve 502 shown in FIG. 5. In this example, the processor 120 implements a dual range fine analysis shown in FIG. 6, utilizing a narrower transmit pulse (pulse width PW2 implemented by the transmit enable signal waveform 612 in graph 610), with the receive circuit 140 being enabled via receive enable signal waveform 622 in graph 620 during a second range R2 from T1 through T2 (including TD1), as well as in a subsequent third range R3 extending from T3 through T4 (including TD2). In another possible embodiment, the processor 120 may instead utilize fine analysis over a single second range, for instance, from T1 through T4 using a higher sample rate 1/TS2 to obtain a single second set of sample data for correlation to verify/identify defect locations TD1 and TD2 based on the initial suspected locations identified in the coarse processing.

Figure 7:
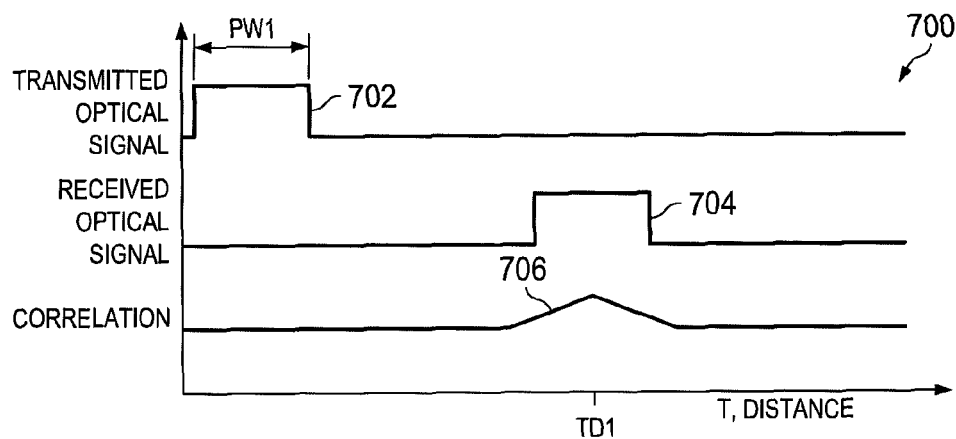
FIG. 7 is a graph showing use of a first pulse width to identify a single defect location in the system of FIG. 1.
Figure 8:
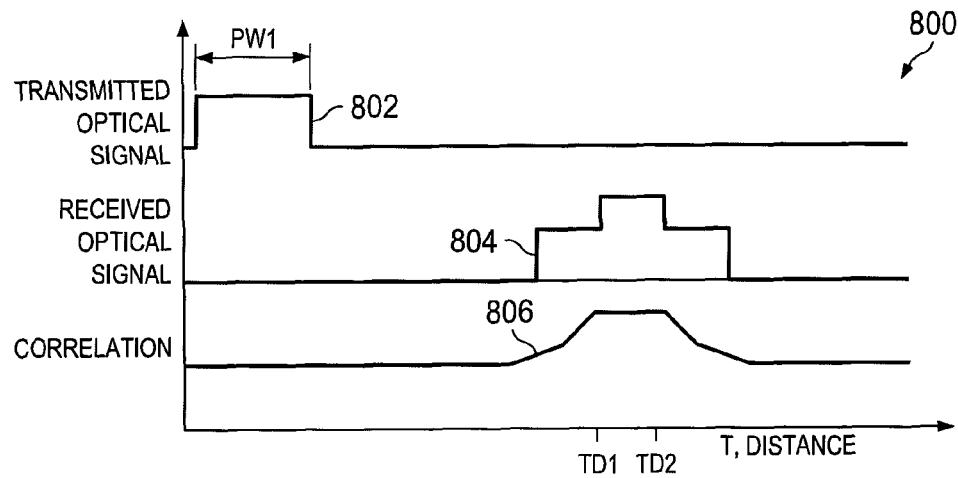
FIG. 8 is a graph showing use of a first pulse width to attempt to identify multiple defect locations in the system of FIG. 1.
Figure 9:
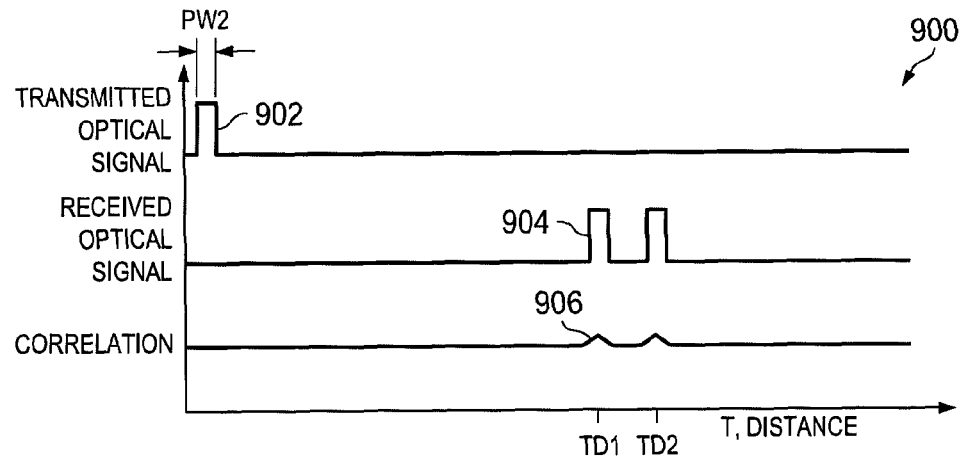
FIG. 9 is a graph showing use of a second narrower pulse width to distinctly identify multiple defect locations in the system of FIG. 1.

Referring also to FIGS. 7-9, the system 100 and process 200 advantageously provide for selective use of higher sampling rates to achieve a desired final resolution of the location of one or more defects in the optical cable 102 under test. In certain implementations, the sample rate of the ADC 146 is set by the processor 120 in the fine processing at least partially according to a target defect location resolution, e.g., 0.5 m for a 13 Km cable in one example, where the sampling period TS2 is set to be less than the time taken for light to travel the resolution distance. With respect to selective pulse width adjustment by the processor 120, moreover, the received signal 142 from the optical sensor 108 is sampled, converted and correlated with the transmitted signal to obtain the location of the defects. The graph 700 in FIG. 7 shows an example transmitted optical signal curve 702 and a received optical signal curve 704 in the case of a single detectable defect at TD1 (e.g., again corresponding to the defect location DL1 shown in FIG. 1 above). In this case, an example correlation curve 706 is produced and analyzed by the processor 120 during the fine processing described above to identify/confirm the suspected location TD1 as including a defect in the cable 102.

FIG. 8 shows a graph 800 illustrating a different situation in which there are two closely spaced defects at TD1 and TD2. As seen in FIG. 8, the use of a relatively wide pulse width PW1 in the transmitted optical signal curve 802 provides a received optical signal waveform 804 presenting difficulties in identifying the separate defect locations TD1 and TD2, where the correlation curve 806 does not include easily distinguishable characteristics for these two defect locations. In this case, the processor 120 may identify only a single suspected defect location (e.g., midway between TD1 and TD2) during the initial or coarse processing.

As further seen in the graph 900 of FIG. 9, the selective employment of a narrower pulse width PW2 in the transmitted optical signal curve 902 during fine processing yields a received optical signal curve 904 having separately distinct pulse shapes. As previously mentioned, the lower energy in a narrow-width input pulse 902 sacrifices SNR, and thus the correlation signal waveform 906 in this case also has a lower amplitude compared with that of FIG. 8, but results in distinct ramp shapes allowing the processor 120 to distinguish the two identifiable defect locations at TD1 and TD2. In certain embodiments, the assessor 120 advantageously provides the fine processing using a smaller pulse width PW2 (<PW1), thus facilitating identification of multiple defect locations even in situations where the initial coarse processing identified only a single corresponding suspected defect location. In this regard, the processor 120 in certain embodiments maintains a sampling period TS2 for the fine processing to be less than or equal to half the pulse width PW2 to ensure that the reflected pulses corresponding to actual defect locations are separately identified by the temporal correlation.

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. A method for locating defects in an optical cable, the method comprising:
   transmitting a first optical signal at a first location of the optical cable;
   sampling optical reflections at the first location of the optical cable at a first sample rate over a first time range following transmission of the first optical signal to obtain a first set of sample data corresponding to reflections of the first optical signal;
   identifying a first time in the first time range corresponding to a suspected defect location of the optical cable based at least partially on a temporal correlation of the first set of sample data with the transmitted first optical signal;
   transmitting a second optical signal at the first location of the optical cable;
   selectively sampling optical reflections at the first location of the optical cable at a second sample rate over a second time range following transmission of the second optical signal to obtain a second set of sample data corresponding to reflections of the second optical signal, the second time range including the first time, the second time range being less than the first time range, and the second sample rate being greater than the first sample rate; and
   identifying at least one defect location of the optical cable based at least partially on a temporal correlation of the second set of sample data with the transmitted second optical signal.

2. The method of claim 1, wherein the first optical signal is transmitted with a first pulse width, wherein the second optical signal is transmitted with a second pulse width, and wherein the first pulse width is greater than the second pulse width.

3. The method of claim 1, wherein the second sample rate is greater than or equal to a constant K times the first sample rate, and wherein the constant K is greater than 1.

4. The method of claim 1, comprising identifying multiple defect locations (DL1, DL2) of the optical cable based at least partially on the temporal correlation of the second set of sample data with the transmitted second optical signal.

5. The method of claim 1, comprising:
   identifying a second time in the first time range corresponding to a second suspected defect location of the optical cable based at least partially on the temporal correlation of the first set of sample data with the transmitted first optical signal;
   selectively sampling optical reflections at the first location of the optical cable at the second sample rate in a third time range following transmission of the second optical signal to obtain a third set of sample data corresponding to reflections of the second optical signal, the third time range including the second time, and the third time range being less than the first time range; and
   identifying a second defect location of the optical cable based at least partially on a temporal correlation of the third set of sample data with the transmitted second optical signal.

6. The method of claim 1, wherein the first optical signal is transmitted with a first pulse width, wherein the second optical signal is transmitted with a second pulse width, and wherein the second pulse width is greater than or equal to 2 divided by the second sample rate.

7. The method of claim 1, wherein the second sample rate is greater than or equal to twice the speed of light in the optical cable divided by a target defect location resolution.

8. The method of claim 6, wherein the first pulse width is greater than the second pulse width.

9. The method of claim 7, wherein the first optical signal is transmitted with a first pulse width, wherein the second optical signal is transmitted with a second pulse width, and wherein the second pulse width is greater than or equal to 2 divided by the second sample rate.

10. The method of claim 9, wherein the first pulse width is greater than the second pulse width.

11. An optical time domain reflectometer (OTDR) system, comprising:
    a transmit circuit operative to generate a transmit signal defining at least one pulse;
    an optical source operative to transmit optical signals at a first location of an optical cable according to the transmitted signal from the transmit circuit;
    an optical sensor operative to receive optical reflections at the first location of the optical cable and to generate a receive signal according to the received optical reflections;
    a receive circuit operative to sample the receive signal at a selectable sample rate and to provide sample data corresponding to the optical reflections received by the optical sensor;
    an electronic memory operative to store the sample data; and
    at least one processor operatively coupled with the transmit circuit, the receive circuit, and the electronic memory, the at least one processor operative to:
       provide at least one transmit control signal or value to cause the transmit circuit and the optical source to generate a first optical signal at the first location of the optical cable,
       provide at least one receive control signal or value to cause the receive circuit to sample the receive signal at a first sample rate over a first time range following transmission of the first optical signal to obtain a first set of sample data corresponding to reflections of the first optical signal,
       temporally correlate the first set of sample data with the transmitted first optical signal,
       identify a first time in the first time range corresponding to a suspected defect location of the optical cable based at least partially on the temporal correlation of the first set of sample data with the transmitted first optical signal;
       provide at least one further transmit control signal or value to cause the transmit circuit and the optical source to generate a second optical signal at the first location of the optical cable,
       provide at least one further receive control signal or value to cause the receive circuit to sample the receive signal at a second sample rate over a second time range following transmission of the second optical signal to obtain a second set of sample data corresponding to reflections of the second optical signal, the second time range including the first time, the second time range being less than the first time range, and the second sample rate being greater than the first sample rate, temporally correlate the second set of sample data with the transmitted second optical signal, and identify at least one defect location of the optical cable based at least partially on the temporal correlation of the second set of sample data with the transmitted second optical signal.

12. The OTDR system of claim 11, wherein the receive circuit comprises:
 a signal conditioning circuit operative to provide an output signal based on the received signal from the optical sensor;
 an analog to digital converter circuit operative to sample the output signal of the signal conditioning circuit at the selectable sample rate and to provide the sample data; and
 a memory operative to store the sample data from the analog to digital converter.

13. The OTDR system of claim 11, wherein the at least one processor is operative to provide the at least one receive control signal or value and the at least one further receive control signal or value to set the second sample rate of the receive circuit to be greater than the first sample rate.

14. The OTDR system of claim 11, wherein the at least one processor is operative to provide the at least one further receive control signal or value to set the second sample rate of the receive circuit to be greater than or equal to twice the speed of light in the optical cable divided by a target defect location resolution.

15. The OTDR system of claim 11, wherein the at least one processor is operative to provide the at least one transmit control signal or value and the at least one further transmit control signal or value to set the first pulse width to be greater than the second pulse width.

16. The OTDR system of claim 11, wherein the at least one processor is operative to:
 provide the at least one transmit control signal or value to cause the transmit circuit and the optical source to generate the first optical signal with a first pulse width; and
 provide the at least one further transmit control signal or value to cause the transmit circuit and the optical source to generate the second optical signal with a second pulse width, the second pulse width being greater than or equal to 2 divided by the second sample rate.

17. The OTDR system of claim 16, wherein the at least one processor is operative to provide the at least one transmit control signal or value and the at least one further transmit control signal or value to set the first pulse width to be greater than the second pulse width.

18. An integrated circuit for an optical time domain reflectometer (OTDR) system, the integrated circuit comprising:

a transmit circuit operative to generate a transmit signal defining at least one pulse for controlling an optical source to transmit optical signals;
 a receive circuit operative to sample receive signals from an optical sensor receiving optical reflections at a selectable sample rate and to provide sample data corresponding to the optical reflections;
 an electronic memory operative to store the sample data; and
 at least one processor operatively coupled with the transmit circuit, the receive circuit, and the electronic memory, the at least one processor operative to:
  provide at least one transmit control signal or value to cause the transmit circuit and the optical source to generate a first optical signal at a first location of an optical cable,
  provide at least one receive control signal or value to cause the receive circuit to sample the receive signal at a first sample rate over a first time range following transmission of the first optical signal to obtain a first set of sample data corresponding to reflections of the first optical signal,
  identify a first time in the first time range corresponding to a suspected defect location of the optical cable based at least partially on a temporal correlation of the first set of sample data with the transmitted first optical signal;
  provide at least one further transmit control signal or value to cause the transmit circuit and the optical source to generate a second optical signal at the first location of the optical cable,
  provide at least one further receive control signal or value to cause the receive circuit to sample the receive signal at a second sample rate over a second time range following transmission of the second optical signal to obtain a second set of sample data corresponding to reflections of the second optical signal, the second time range including the first time, the second time range being less than the first time range, and the second sample rate being greater than the first sample rate, and
  identify at least one defect location of the optical cable based at least partially on the temporal correlation of the second set of sample data with the transmitted second optical signal.

19. The integrated circuit of claim 18, wherein the at least one processor is operative to provide the at least one transmit control signal or value and the at least one further transmit control signal or value to set the first pulse width to be greater than the second pulse width.

20. The integrated circuit of claim 18, wherein the at least one processor is operative to provide the at least one further receive control signal or value to set the second sample rate of the receive circuit to be greater than or equal to twice the speed of light in the optical cable divided by a target defect location resolution.

* * * * *